United States Patent
Lauff et al.

(10) Patent No.: US 8,959,488 B2
(45) Date of Patent: Feb. 17, 2015

(54) METHOD AND COMPUTER SYSTEM FOR EVALUATING THE COMPLEXITY OF A USER INTERFACE

(75) Inventors: Markus Lauff, Oftersheim (DE); Jun Ma, Stutensee (DE); Axel Spriestersbach, Karlsruhe (DE); Cedric S. P. Ulmer, Nice (FR); Thomas Ziegert, Darmstadt (DE)

(73) Assignee: SAP SE, Walldorf (DE)

( * ) Notice: Subject to any disclaimer, the term of this patent is extended or adjusted under 35 U.S.C. 154(b) by 1619 days.

(21) Appl. No.: 10/582,937

(22) PCT Filed: Dec. 14, 2004

(86) PCT No.: PCT/EP2004/053444
§ 371 (c)(1),
(2), (4) Date: Jun. 15, 2006

(87) PCT Pub. No.: WO2005/059742
PCT Pub. Date: Jun. 30, 2005

(65) Prior Publication Data
US 2007/0162874 A1    Jul. 12, 2007

(30) Foreign Application Priority Data
Dec. 18, 2003    (EP) .................................... 03029167

(51) Int. Cl.
*G06F 9/44*    (2006.01)

(52) U.S. Cl.
CPC .................................... *G06F 8/38* (2013.01)
USPC ............................ 717/125; 717/104; 717/120

(58) Field of Classification Search
None
See application file for complete search history.

(56) References Cited

U.S. PATENT DOCUMENTS

| | | | |
|---|---|---|---|
| 5,390,354 A | | 2/1995 | de Heus et al. |
| 5,600,789 A | * | 2/1997 | Parker et al. ..................... 714/38 |
| 5,724,262 A | * | 3/1998 | Ghahramani ................. 702/186 |
| 5,808,908 A | * | 9/1998 | Ghahramani ................. 702/182 |
| 5,983,016 A | * | 11/1999 | Brodsky et al. ................ 717/104 |
| 6,016,394 A | * | 1/2000 | Walker ........................... 717/104 |
| 6,091,896 A | * | 7/2000 | Curreri et al. ................. 717/125 |

(Continued)

FOREIGN PATENT DOCUMENTS

| | | |
|---|---|---|
| WO | WO-0177822 | 10/2001 |
| WO | WO-2005059743 | 6/2005 |

OTHER PUBLICATIONS

Tim Comber and John Maltby "Investigating Layout Complexity" Southern Corss University Mar. 2003 <http://citeseerx.ist.psu.edu/viewdoc/download?doi=10.1.1.88.7330&rep=rep1&type=pdf>.*

(Continued)

*Primary Examiner* — Thuy Dao
*Assistant Examiner* — Samuel Hayim
(74) *Attorney, Agent, or Firm* — Schwegman, Lundberg & Woessner, P.A.

(57) ABSTRACT

Method and computer system for evaluating the complexity a user interface are provided. A complexity indicator receives device class specific representations of the user interface. Each device class specific representation refers to a respective device class. The complexity indicator determines complexity values of layout components of the device class specific representations by using complexity evaluation functions associated with the layout components and aggregates the complexity values by device class according to a corresponding layout component hierarchy of the respective device class specific representation.

16 Claims, 3 Drawing Sheets

(56) References Cited

U.S. PATENT DOCUMENTS

| | | | |
|---|---|---|---|
| 6,173,286 B1* | 1/2001 | Guttman et al. | 715/234 |
| 6,189,142 B1* | 2/2001 | Johnston et al. | 717/125 |
| 6,199,195 B1* | 3/2001 | Goodwin et al. | 717/104 |
| 6,202,199 B1* | 3/2001 | Wygodny et al. | 717/125 |
| 6,226,792 B1* | 5/2001 | Goiffon et al. | 717/120 |
| 6,279,030 B1* | 8/2001 | Britton et al. | 717/120 |
| 6,366,918 B1* | 4/2002 | Guttman et al. | 707/690 |
| 6,405,364 B1* | 6/2002 | Bowman-Amuah | 717/120 |
| 6,411,700 B1* | 6/2002 | Rojas | 379/220.01 |
| 6,658,648 B1* | 12/2003 | Douceur et al. | 717/120 |
| 6,750,885 B1* | 6/2004 | Finch et al. | 715/777 |
| 6,976,218 B2* | 12/2005 | Stanford-Clark | 715/744 |
| 7,080,323 B2* | 7/2006 | Knott et al. | 715/747 |
| 7,124,398 B2* | 10/2006 | Chen et al. | 717/106 |
| 7,308,288 B2* | 12/2007 | Pasquale et al. | 455/566 |
| 2002/0012423 A1* | 1/2002 | Rojas | 379/67.1 |
| 2002/0012427 A1* | 1/2002 | Rojas | 379/229 |
| 2002/0054669 A1* | 5/2002 | Rojas | 379/67.1 |
| 2002/0099740 A1 | 7/2002 | Patrick | |
| 2002/0113816 A1 | 8/2002 | Mitchell et al. | |
| 2002/0156799 A1* | 10/2002 | Markel et al. | 707/202 |
| 2003/0090513 A1* | 5/2003 | Ramakrishnan | 345/744 |
| 2004/0083463 A1* | 4/2004 | Hawley | 717/140 |
| 2004/0090458 A1* | 5/2004 | Yu et al. | 345/760 |
| 2005/0015747 A1 | 1/2005 | Zatloukal et al. | |
| 2005/0054384 A1* | 3/2005 | Pasquale et al. | 455/566 |
| 2005/0086579 A1* | 4/2005 | Leitner et al. | 715/500 |
| 2005/0210397 A1* | 9/2005 | Kanai et al. | 715/762 |
| 2006/0026506 A1* | 2/2006 | Kristiansen et al. | 715/517 |
| 2006/0095276 A1 | 5/2006 | Axelrod et al. | |
| 2006/0259865 A1* | 11/2006 | Knott et al. | 715/741 |
| 2006/0277157 A1* | 12/2006 | Seidl et al. | 707/2 |
| 2009/0024937 A1 | 1/2009 | Lauff et al. | |

OTHER PUBLICATIONS

J.A. Royo N. Mitrovic and E. MEna "ADUS: Indirect Generation of User Interface on Wireless Devices" University of Zaragoza Jun. 16, 1999.*

Tim Comber et al., "Evaluating usability of screen designs with layout complexity", Southern Cross University, 1995, <http://epubs.scu.edu.au/cgi/viewcontent.cgi?article=1000&context=comm_pubs>, pp. 1-6.*

Andrew Sears, "Layout Appropriateness: A Metric for Evaluating User Interface Widget Layout", IEEE, 1993, <http://ieeexplore.ieee.org/stamp/stamp.jsp?tp=&arnumber=238571>, pp. 1-13.*

Geoffrey Hubona, "Evaluating User Interface Design with Belief Constructs", IEEE, 1995, <http://ieeexplore.ieee.org/stamp/stamp.jsp?tp=&arnumber=375678>, pp. 1-10.*

Steve Whittaker et al., "SCAN: Designing and evaluating user interfaces to support retrieval from speech archives", ACM, 1999, <http://delivery.acm.org/10.1145/320000/312639/p26-whittaker.pdf>, pp. 1-9.*

"International Search Report for Application No. PCT/EP200453444", 2 pgs.

Melcher, R, et al., "Improving the user experience on mobile devices and services", *In: Proceeding of the Telecommunication and Mobile Computing*, Workshop on telecommunications and mobile computing,(2003).

Noble, J, et al., "Interactive design metric visualization: visual metric support for user interface design", *Proceedings—Sixth Australian Conference on Computer-Human Interaction*, IEEE, (1996),213-220.

"U.S. Appl. No. 10/583,184, Non Final Office Action mailed Aug. 30, 2012", 14 pgs.

"Search Report for International Application No.", (Jan. 25, 2005), 3 pgs.

"XML Editor with Intelligent Editing", [Online]. Retrieved from the Internet: <URL: http://web.archive.org/web/20021019120059/http://www.altova.com/features_editing.html>, (2005), 8 pgs.

Dermler, et al., "Flexible pagination and layouting for device independent authoring", IBM, (2003), 5 pgs.

Hori, Masahiro, et al., "Annotation-Based Web Content Transcoding", Computer Networks, 33, (Jun. 2000), 197-211.

Jacobs, et al., "Adaptive Grid-Based Document Layout", ACM, (2003), 10 pgs.

Leszek, P., "XML Development with Eclipse", [Online]. Retrieved from the Internet: <URL: http://www-128.ibm.com/developerworks/library/os-ecxml/>, (Apr. 8, 2003), 10 pgs.

Suzaki, K., "Adaptive algorithm selection method (AASM) for dynamic software tuning", Seventeenth Annual International Computer Software and Applications Conference, 1993. COMPSAC 93. Proceedings., (1993), 248-256.

Tichy, Gabriel, "Code folding—user interface specification", [Online]. Retrieved from the Internet: <URL: http://ui.netbeans.org/docs/ui/code_folding/cf_uispec.html>, (Accessed Mar. 22, 2006), 7 pgs.

"U.S. Appl. No. 10/583,184, Final Office Action mailed Mar. 25, 2013". 20 pgs.

"U.S. Appl. No. 10/583,184, Response filed Jun. 21, 2013 to Final Office Action mailed Mar. 25, 2013", 15 pgs.

"U.S. Appl. No. 10/583,184, Response filed Nov. 30, 2012 to Non Final Office Action mailed Aug. 30, 2012", 14 pgs.

"U.S. Appl. No. 10/583,184, Non Final Office Action mailed Dec. 19, 2013", 10 pgs.

"U.S. Appl. No. 10/583,184, Preliminary Amendment filed Jun. 16, 2006", 8 pgs.

"U.S. Appl. No. 10/583,184, Response filed Mar. 18, 2014 to Non Final Office Action mailed Dec. 19, 2014", 12 pgs.

* cited by examiner

METHOD AND COMPUTER SYSTEM FOR EVALUATING THE COMPLEXITY OF A USER INTERFACE

CLAIM OF PRIORITY

This application is a U.S. National Stage Filing under 35 U.S.C. 371 from International Patent Application No. PCT/EP2004/053444, filed on Dec. 14, 2004, and published as WO 2005/059742 A1 on Jun. 30, 2005, which in turn claims the priority benefit of EP Application No. 03029167.8 filed on Dec. 18, 2003, the entire content of each application being incorporated herein by reference.

FIELD OF THE INVENTION

The present invention generally relates to electronic data processing, and more particularly, relates to methods, computer program products and systems for device independent document authoring.

BACKGROUND OF THE INVENTION

Some software development platforms, such as the Eclipse Platform, are designed for building integrated development environments (IDEs) that can be used to create applications as diverse as web sites, embedded Java™ programs, C++ programs, and Enterprise JavaBeans™.

Current IDEs support the development of user interfaces for applications that are primarily foreseen to interact with a homogenous delivery context (e.g., a screen of low resolution, such as 800×600 pixels.)

However, more and more heterogeneous devices access application servers running applications that have been developed by using an IDE. Developers have to adapt application user interfaces for different types of delivery context. This task becomes increasingly difficult with the prior art IDEs not providing sufficient support for device independent development of user interface documents.

SUMMARY OF THE INVENTION

The present invention provides computer system, method and computer program product according to the independent claims for improving the support for device independent authoring of user interface documents by generating device class specific information about the complexity of the user interface by device class. A complexity indicator provides this information to the author supporting the author to identify complexity problems in a user interface document related to device class specific restrictions during the development of the document. Thus, the author gains better control of a computer system that includes the complexity indicator and is used for the development of user interfaces for various device classes, because the complexity indicator enables the author to quickly identify and solve problems of the user interface document related to device specific restrictions.

High complexity of a user interface typically has a negative impact on the usability of the user interface. Identifying such problems at early stages of the development usually minimizes efforts for adjusting the document to better comply with the various device class specific restrictions. A result of the device specific document analysis with the complexity indicator can also be that a user interface document cannot be used at all by devices belonging to a specific device class. In this case the author may not release the user interface document for the specific device class.

The aspects of the invention will be realized and attained by means of the elements and combinations particularly pointed out in the appended claims. Also, the described combination of the features of the invention is not to be understood as a limitation, and all the features can be combined in other constellations without departing from the spirit of the invention. It is to be understood that both the foregoing general description and the following detailed description are exemplary and explanatory only and are not restrictive of the invention as described.

DETAILED DESCRIPTION OF THE INVENTION

Figure 1:
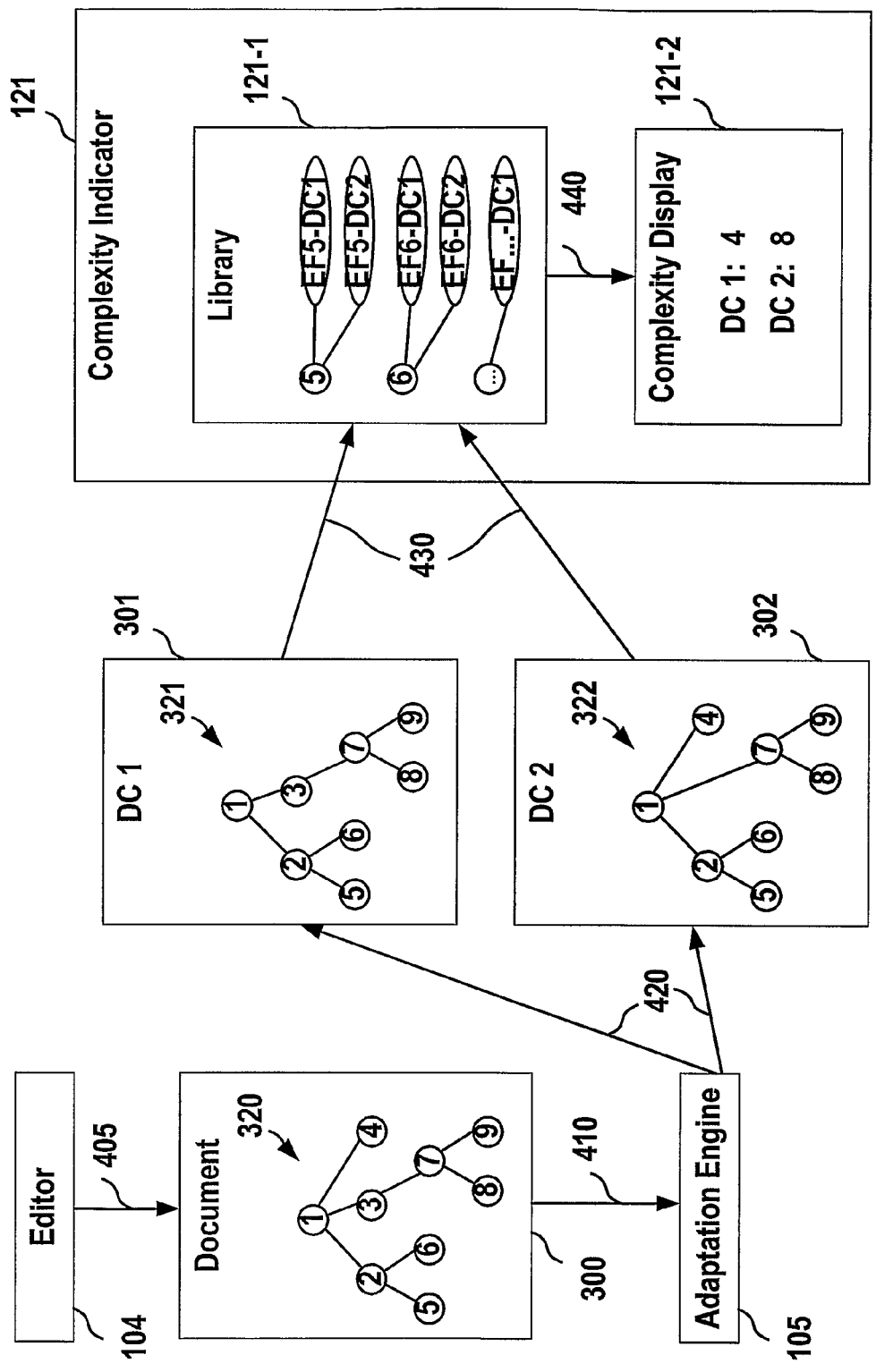
FIG. 1 illustrates a complexity indicator according to the invention as being part of an IDE.

FIG. 1 is a simplified block diagram of an integrated development environment 999 (IDE) that can be used for the development of user interface documents. The IDE can be implemented as a computer program running on a computer system that includes one or more computing devices. The IDE 999 includes an editor 104 for editing 405 documents, such as a user interface document 300, and an adaptation engine 105 for generating 420 device class dependent representations 301, 302 of the document 300. The IDE further includes a complexity indicator 121 for calculating complexity values with respect to the device specific representations 301, 302. The complexity indicator can be implemented as a computer program product having instructions that when loaded into a memory of the computer system can be executed by at least one processor of the computer system to perform an evaluation of the complexity of the user interface.

In the following description, by way of example, the user interface document 300 includes a document description in a Renderer Independent Markup Language (RIML). However, the present invention can be applied to any other document type, such as documents written in Hypertext Markup Language (HTML), Extensible Markup Language (XML), Java, etc. RIML is an XML based markup language. The user interface document can be stored in form of a file or any other suitable data structure.

The complexity indicator 121 provides special support for the development of documents that are used in mobile applications and, therefore, need to be compatible with a variety of device classes. A device class includes a plurality of restrictions that are typical for devices (e.g., mobile devices) belonging to the device class.

Adaptation engines, such as the consensus adaptation engine, are known in the art. The adaptation engine 105 is used to generate 420 the device class specific representations 301, 302 of the document 300. In general, the document 300 includes a layout component hierarchy 320. This hierarchy 320 can be adapted to various device classes DC1, DC2 in different ways. This may result in the different representations 301, 302 of the document 300 for various device classes DC1, DC2. For example, a specific layout component 3 may be suitable for a first device class DC1 but not a second one DC2. This specific layout component 3 can be suppressed by the adaptation engine 103 for the second device class DC2 and, therefore, does not become part of the document's representation 302 for the second device class DC2. An appropriate preview tool may allow the author to choose a specific emulator for a preview. The output of the adaptation engine 103 is generated for the chosen emulator. The author can browse through generated sub-pages in the preview of the document.

The complexity indicator 121 has a complexity evaluation library 121-1 for evaluating the complexity of layout components 1 to 9 used in the document 300 or its device specific representations 301, 302 and further has a complexity display 121-2 for visualizing 440 the result of the complexity evaluation. High complexity of layout components usually has a negative impact on the usability of the user interface that includes the layout components.

The adaptation engine 105 receives 410 the document 300 as input and generates 420 device specific representations of the document considering specific constraints of a device class (e.g., limited display area, memory constraints). In the example, a first representation 301 is generated for device class DC1 and a second representation 302 is generated for device class DC2. Each representation can have a layout component hierarchy 321, 322 that is different from the one 320 of the original document 300. In the example, the adaptation engine removed layout component 4 when generating the first representation 301 and layout component 3, when generating the second representation 302.

The complexity indicator 121 receives 430 information about layout components 1 to 9 and how these layout components are built into the layout component hierarchies 321, 322 of the document representations 301, 302. A layout component can include multiple basic layout elements (e.g., input fields) and group these layout elements in such a way that a specific function of the document (e.g., performing a search) is bundled in the layout component. Sometimes layout components are also referred to as controls.

The complexity indicator 121 determines the layout components and the layout component hierarchy 321, 322 of the respective representation 301, 302.

Further, the complexity indicator 121 calculates a complexity value for each layout component in its respective representation 301, 302. This can be achieved by using a complexity evaluation library 121-1 of the complexity indicator 121. It is sufficient that the complexity indicator can access the library 121-1, which may also be stored elsewhere within the IDE 999. The library 121-1 includes a set of complexity evaluation functions EF5-DC1, EF5-DC2, EF6-DC1, EF6-DC2, etc. Preferably, such an evaluation function exists for each layout component with respect to the various device classes DC1, DC2. This can also be achieved by associating the evaluation functions with specific layout component types, where each layout component is an instance of the respective layout component type. The association of the evaluation functions with the respective layout components is illustrated by a solid line between a layout component and its respective evaluation functions.

The complexity indicator 121 applies the evaluation functions for the various device classes to the associated layout components of the respective representations 301, 302. Each applied evaluation function returns a complexity value for the respective layout component. For example, return values may range from 1 to 10, where 1 indicates a low complexity of the component and 10 indicates a high complexity of the component. Any other appropriate measure can be used instead. Evaluation criteria used by the evaluation functions can, for example, refer to the number of items that can be displayed simultaneously in the display area of a specific device class or to the number of broken links of the layout component, dependent of the component layout type.

Coding section 1 shows an example of an evaluation function for a select layout element in a PDA device class. For example, a Palm Pilot belongs to the PDA device class. The basic assumption is that a reasonable number of items displayed on the Palm Pilot should not exceed 12.

Coding section 1:

```
int n = number of options
bool sortedList = ?
int items (area size ) = 12
int UnsortedMaximalLevelTragetKnown = 36
int MaxScreens = 6.5
IF (sortedList = TRUE)
    IF n <= items (area size ) return 1
    IF ((x <= MaxScreens) && (n <= x * items (area size) ) )
return x
    ELSE return 10
```

Coding section 2 shows an example of an evaluation function for a select layout element in a cell phone device class. For example, a Nokia 7650 belongs to the cell phone device class. The basic assumption is that a reasonable number of items displayed on the Nokia 7650 should not exceed 7.

Coding section 2:

```
int n = number of options
bool sortedList = ?
int items (area size ) = 7
int UnsortedMaximalLevelTragetKnown = 20
int MaxScreens = 5.5
IF (sortedList = TRUE)
    IF n <= items (area size ) return 1
    IF ((x <= MaxScreens) && (n <= x * items (area size) ) )
return x
    ELSE return 10
```

Then, the complexity indicator aggregates the returned complexity values for the various representations 301, 302 according to the respective layout component hierarchies 321, 322. Aggregate complexity values can be determined for the various levels in the layout component hierarchies 321, 322.

For example, layout component 2 may represent a menu that includes two sub-menus (layout components 5 and 6). When applying the evaluation functions EF5-DC1 and EF6-DC1 to the sub-menus 5, 6 for the first device class DC1 (first representation 301), the aggregation algorithm may propagate the maximum complexity value of both sub-menus to the menu 2, assuming that the complexity value of the menu 2 cannot be less than the highest complexity value of is sub-menus. The same applies to the second device class DC2 when applying the evaluation functions EF5-DC2 and EF6-DC2. However, even in case that both sub-menus 5, 6 have a low complexity value, the overall complexity of the menu 2 can still be higher. Therefore, in addition to propagating complexity values of child nodes in the layout component hierarchy to the parent node, an evaluation function can be applied directly to the parent node. For example, the sub-menus can have complexity values of "3" and "5". However, the usage of both sub-menus in the menu 2 can lead to a complexity value "7" for the menu 2 (parent node) itself. Thus, the propagated complexity value of the sub-menus max("3";"5")="5" would be overruled by the complexity indicator with the higher complexity value "7" that is directly calculated for the parent node (menu 2).

The complexity indicator can then visualize 440 the various complexity values for the author in a complexity display 121-2. For example, the aggregate complexity values "4" and "8" for the respective component hierarchies 321, 322 can be displayed for each device class DC1, DC2.

Figure 2:
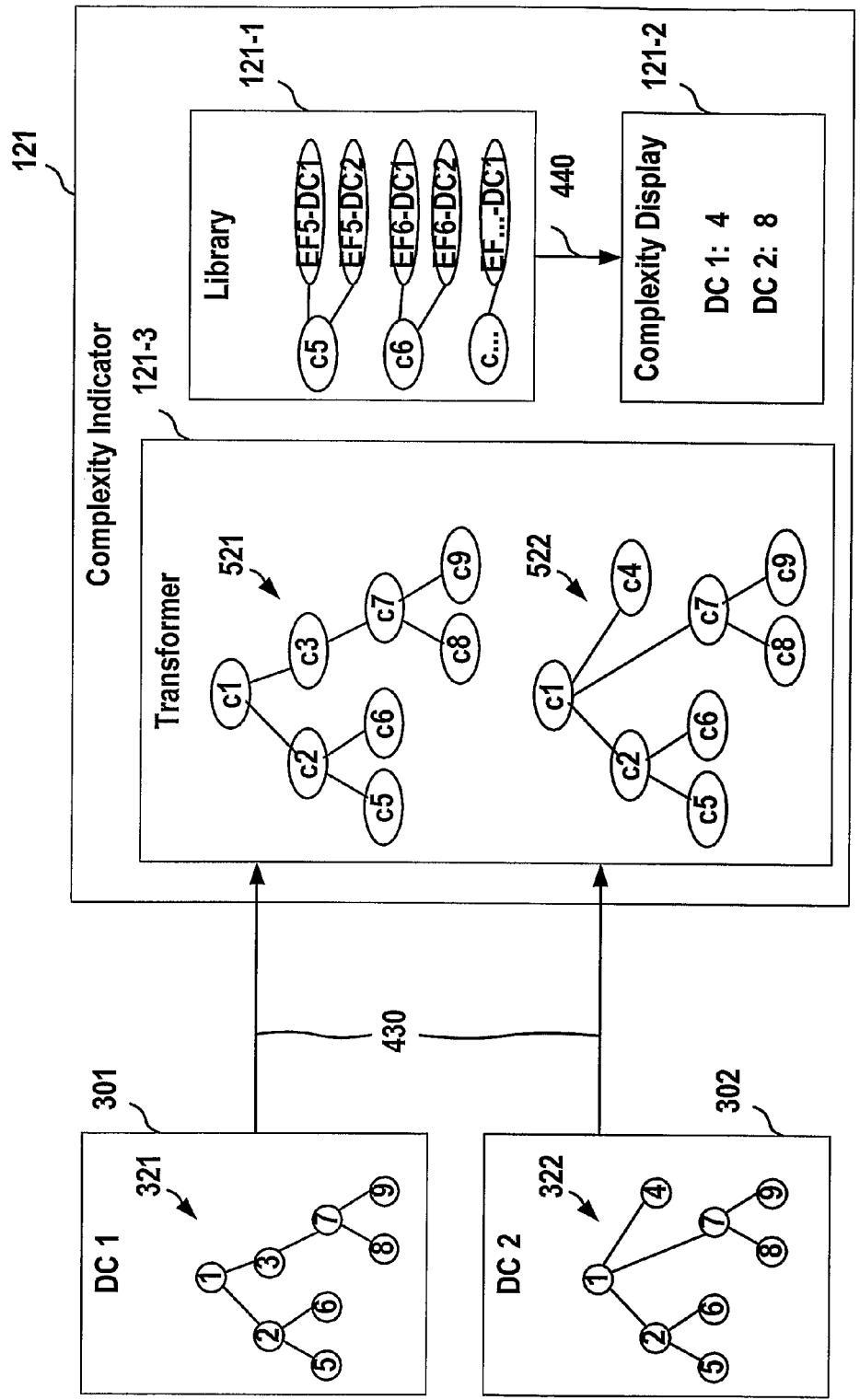
FIG. 2 shows an alternative implementation of the complexity indicator with an abstraction layer.
Figure 3:
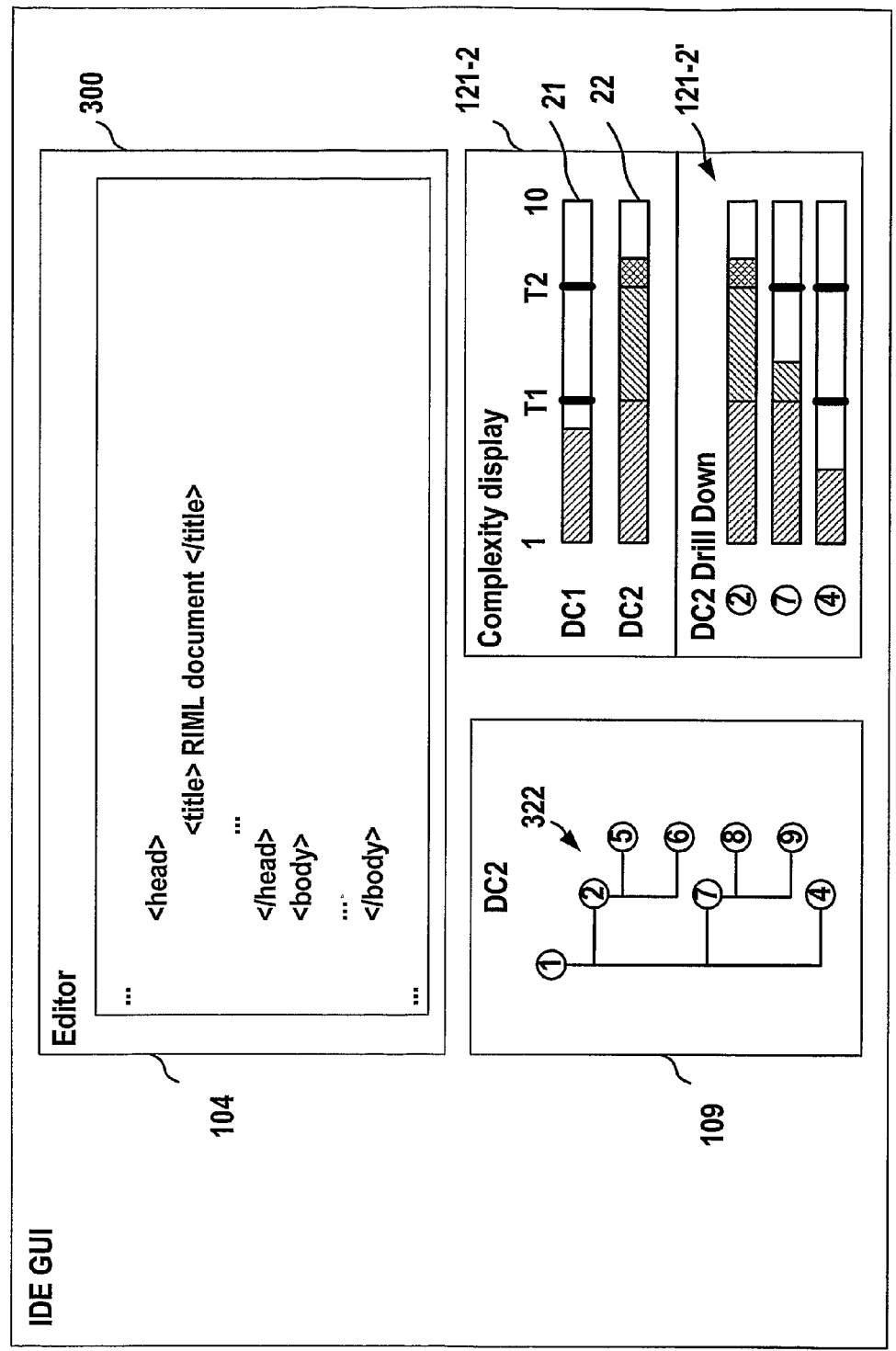
FIG. 3 shows an implementation of a complexity display when integrated into the IDE main window.

FIG. 2 illustrates an alternative implementation of the complexity indicator 121, where the complexity indicator processes complexity evaluation hierarchies instead of layout component hierarchies. For this purpose, the complexity indicator 121 can include a transformer 121-3 that can transform the layout component hierarchy 321, 322 of each representation 301, 302 into a corresponding markup language independent complexity evaluation hierarchy 521, 522. The complexity evaluation hierarchy 521, 522 includes the same information as the respective layout component hierarchy 321, 322 but is described in a generic language to which the evaluation functions can be applied. Using a language independent complexity evaluation hierarchy enables the complexity indicator to use a single set of evaluation functions being associated with components c1 to c9 of the complexity evaluation hierarchy 521, 522 in the complexity library 121-1. This association becomes independent from the markup language being used for the original document 300 or its device specific representations 301, 302. The complexity hierarchy layer is an abstraction layer between the representations 301, 302 and the complexity evaluation functions of the library 121-1 that helps to avoid that an evaluation function for a layout component needs to be redundantly provided for various markup languages, such as RIML, XHTML, HTML, etc. FIG. 3 shows an alternative implementation of the complexity display 121-2 when integrated into the IDE graphical user interface (GUI).

The complexity values for each device class DC1, DC2 are visualized as graphical bars 21, 22. In the example, complexity values increase from the left value 1 to the right value 10. Threshold values T1, T2 are used to change the appearance of the bars 21, 22 dependent on the visualized threshold value. For example, complexity values below T1 have a first grid structure or a first colour. Complexity values between T1 and T2 have a second grid structure or a second colour and complexity values above T2 have a third grid structure or a third colour. Other presentations, such as traffic lights changing the colour when exceeding a threshold value, are also possible.

The complexity display 121-2 further can have a drill down section 121-2', where complexity values can be shown on different hierarchy levels down to the complexity of an isolated layout component for a selected device class. In the example, the drill down is made for the second device class DC2. Apparently, the high complexity value originates from the layout component 2, whereas the complexity value of layout components 4 and 7 is relatively low. A further drill down can be made for each of the layout components to determine the origin of high complexity values.

A tree-based outline editor 109 can be interfaced to the complexity indicator 121 so that, when it is displayed simultaneously on the IDE GUI, a layout component that is selected in the complexity display 121-2 is highlighted in the component hierarchy 322 shown in the tree-based outline editor 109.

In general, the tree-based outline editor 109 can generate an outline view of the edited document 300 or its device specific representation 301, 302, such as an XML tree view of a RIML document. For example, the outline view can be a graphical display of the corresponding layout component hierarchy.

In this example the tree-based outline editor 109 displays the layout component hierarchy 322 of the respective representation 302 that corresponds to the device class DC2 that is currently drilled down in the complexity indicator.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. An computer program for device dependent authoring of user interface documents including a complexity indicator as described above can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disk's. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A complexity indicator having a memory for storing instructions to evaluate the complexity of a user interface that has device class specific representations, each device class specific representation referring to a respective device class and having a respective layout component hierarchy; the complexity indicator comprising:
a library having complexity evaluation functions to determine complexity values of layout components of the respective layout component hierarchies, each combination of a layout component and the respective device class having a distinct complexity evaluation function, the complexity values are numerical complexity values;
a processor configured by the complexity indicator to apply the distinct complexity evaluation function retrieved from the library to the layout component for the respective device class for each combination of the layout component and the respective device class to generate a numerical complexity value for the combination;
an aggregator to aggregate the numerical complexity values generated from application of the distinct complexity evaluation function retrieved from the library to the layout component for the respective device class for each combination of the layout component and the respective device class of the corresponding layout component hierarchy of the respective device class specific representation into a single aggregated numerical complexity value for each device class, the layout component hierarchy comprising a parent node and child nodes, the aggregator to aggregate by propagating a highest numerical complexity value of the child nodes to the parent node; and
a complexity display to visually present the single aggregated numerical complexity value for each device class of the respective layout component hierarchies.

2. The complexity indicator of claim 1, further comprising:
a transformer to transform the layout component hierarchy of each representation into a corresponding complexity evaluation hierarchy so that the association of each evaluation function with its respective layout component is redirected through the corresponding component of the respective complexity evaluation hierarchy and the evaluation function is applied to the corresponding component of the respective complexity evaluation hierarchy.

3. The complexity indicator of claim 1, wherein the complexity display has a drill down portion to visualize complexity values of layout components related to a selected device class.

4. The complexity indicator of claim 3 in combination with a tree-based outline editor to generate an outline view of the representation that corresponds to the selected device class configured to highlight a layout component that is selected in the complexity display for drill down purposes.

5. A method for complexity evaluation of a user interface, the method comprising:
receiving device class specific representations of the user interface, each device class specific representation referring to a respective device class;
determining numerical complexity values of layout components of the device class specific representations by applying complexity evaluation functions retrieved from a library having complexity evaluation functions used to determine complexity values of layout components of the respective layout component hierarchies, each combination of a layout component and the respective device class having a distinct complexity evaluation function, the distinct complexity evaluation function retrieved from the library being applied to the layout component for the respective device class for each combination of the layout component and the respective device class to generate the numerical complexity value for the combination;
aggregating, using one or more processors, the numerical complexity values generated from application of the distinct complexity evaluation function retrieved from the library of complexity evaluation functions to the layout component for the respective device class for each combination of the layout component and the respective device class of a corresponding layout component hierarchy of the respective device class specific representation into a single aggregated numerical complexity value for each device class, the layout component hierarchy comprising a parent node and child nodes, the aggregating comprising propagating a highest numerical complexity value of the child nodes to the parent node; and
visually presenting the single aggregated numerical complexity value for each device class of the respective layout component hierarchies.

6. The method of claim 5, further comprising:
transforming the layout component hierarchy of each representation into a corresponding complexity evaluation hierarchy so that the association of each evaluation function with its respective layout component is redirected through the corresponding component of the respective complexity evaluation hierarchy and the evaluation function is applied to the corresponding component of the respective complexity evaluation hierarchy.

7. The method of claim 5, wherein the visually presenting comprises:
visualizing complexity values of layout components related to a selected device class in a drill down portion.

8. A computer system having at least one computing device configured to run an integrated development environment that includes a complexity indicator, the complexity indicator comprising:
a library having complexity evaluation functions to determine complexity values of layout components of the respective layout component hierarchies, each combination of a layout component and a device class having a distinct complexity evaluation function, the complexity values are numerical complexity values;
a processor configured by the complexity indicator to apply the distinct complexity evaluation function retrieved from the library to the layout component for the respective device class for each combination of the layout component and the respective device class to generate a numerical complexity value for the combination;
an aggregator to aggregate the numerical complexity values generated from application of the distinct complexity evaluation function retrieved from the library to the layout component for the respective device class for each combination of the layout component and the respective device class of the corresponding layout component hierarchy of the respective device class specific representation into a single aggregated numerical complexity value for each device class, the layout component hierarchy comprising a parent node and child nodes, the aggregator to aggregate by propagating a highest numerical complexity value of the child nodes to the parent node; and a complexity display to visually present the single aggregated numerical complexity value for each device class of the respective layout component hierarchies.

9. A non-transitory machine-readable storage medium storing instructions which when executed by at least one processor of a machine, cause the machine to perform operations comprising:

receiving device class specific representations of the user interface, each device class specific representation referring to a respective device class;

determining numerical complexity values of layout components of the device class specific representations by applying complexity evaluation functions retrieved from a library having complexity evaluation functions used to determine complexity values of layout components of the respective layout component hierarchies, each combination of a layout component and the respective device class having a distinct complexity evaluation function;

aggregating, using one or more processors, the numerical complexity values generated from application of corresponding complexity evaluation functions from the library of complexity evaluation functions for each combination of the layout component and the respective device class of a corresponding layout component hierarchy of the respective device class specific representation into a single aggregated numerical complexity value for each device class, the layout hierarchy comprising a parent node and child nodes, the aggregating comprising propagating a highest numerical complexity value of the child nodes to the parent node; and visually presenting the single aggregated numerical complexity value for each device class of the respective layout component hierarchies.

10. The complexity indicator of claim 1, wherein the aggregator is to overrule the propagated highest numerical complexity value of the child nodes with a higher numerical complexity value calculated for the parent node.

11. The complexity indicator of claim 1, wherein the complexity display is to visually present the aggregated numerical complexity value using a graphical bar.

12. The method of claim 5, further comprising overruling the propagated highest numerical complexity values of the child nodes with a higher numerical complexity value calculated for the parent node.

13. The method of claim 5, wherein the visually presenting comprises presenting the aggregated numerical complexity value using a graphical bar.

14. The complexity indicator of claim 1, wherein the layout component hierarchies are derived from a user interface document for each device class.

15. The computer system of claim 8, wherein the aggregator is to overrule the propagated highest numerical complexity value of the child nodes with a higher numerical complexity value calculated for the parent node.

16. The non-transitory machine-readable storage medium of claim 9, wherein the operations further comprise overruling the propagated highest numerical complexity value of the child nodes with a higher numerical complexity value calculated for the parent node.

* * * * *